April 24, 1928.
L. P. WILLSEA
1,666,984
DELIVERY MECHANISM
Filed Jan. 26, 1927
5 Sheets-Sheet 3
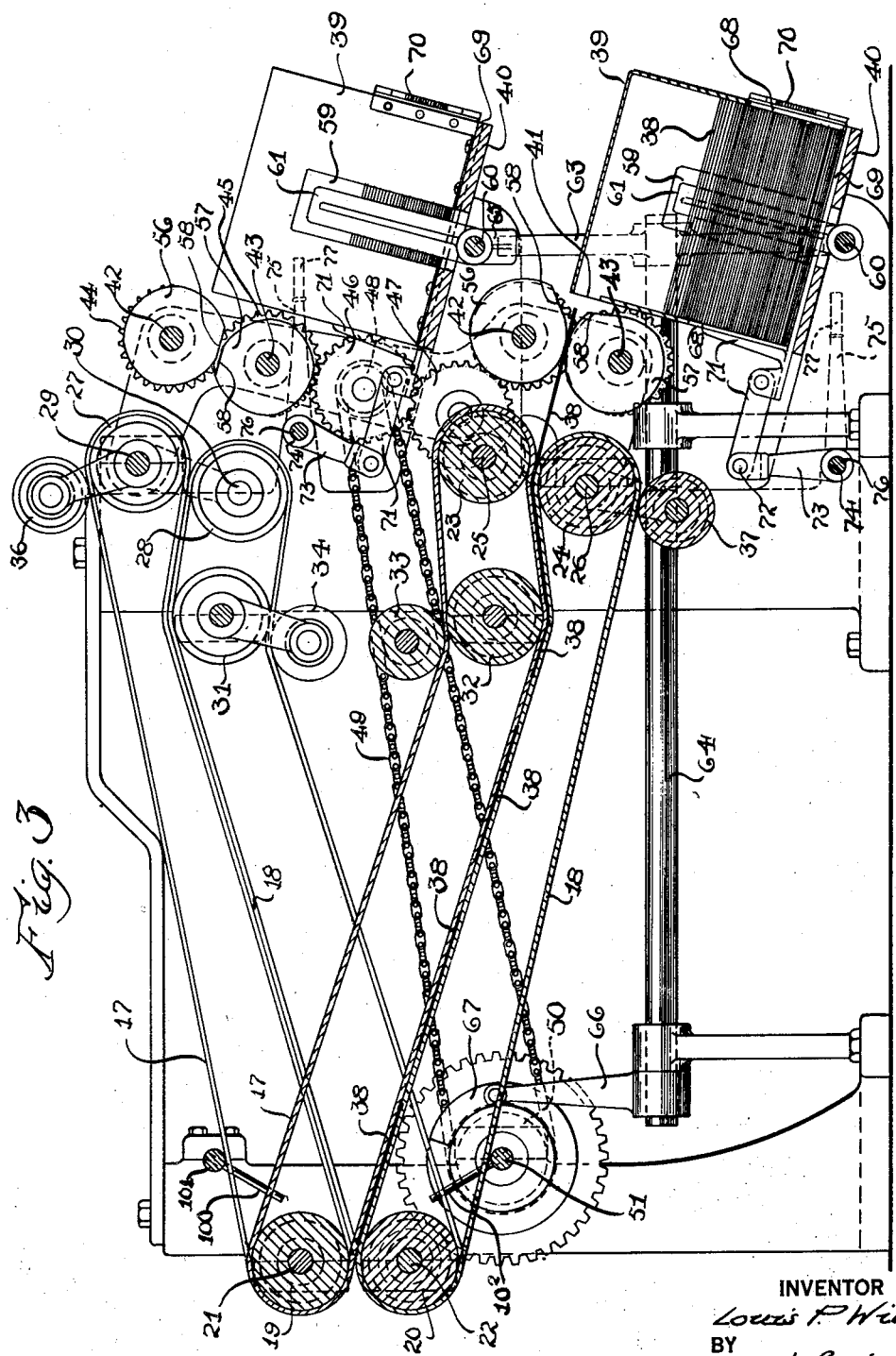
INVENTOR
Louis P. Willsea
BY
his ATTORNEY

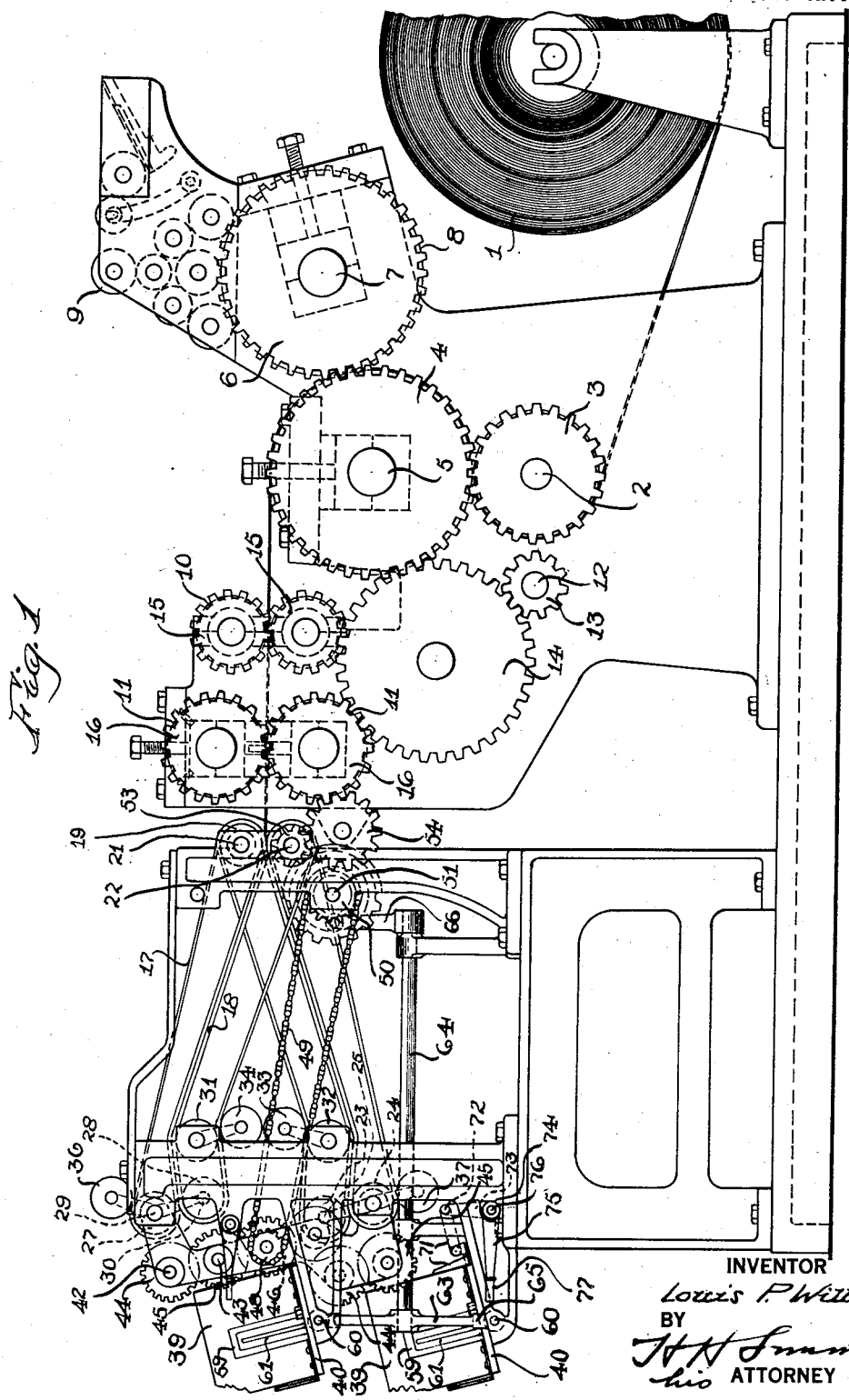

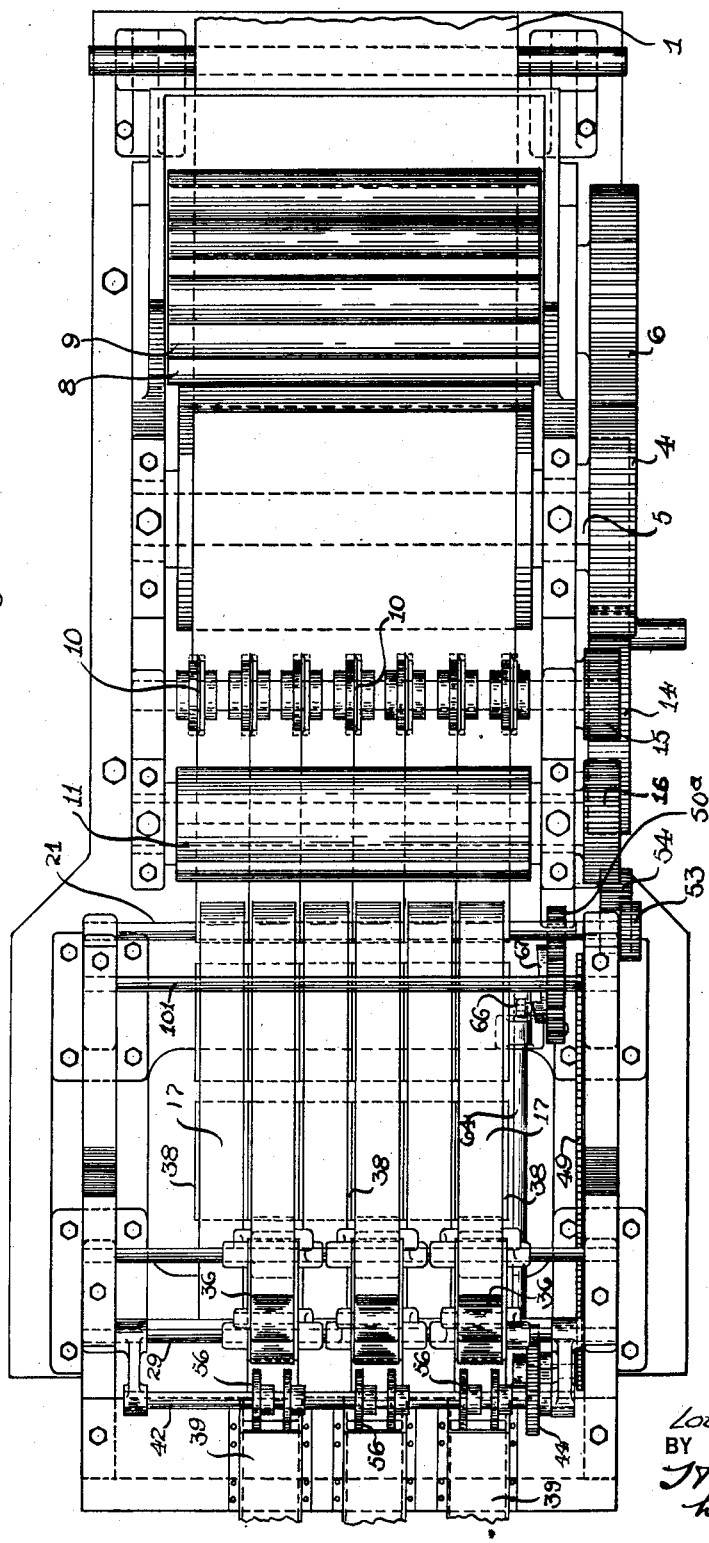

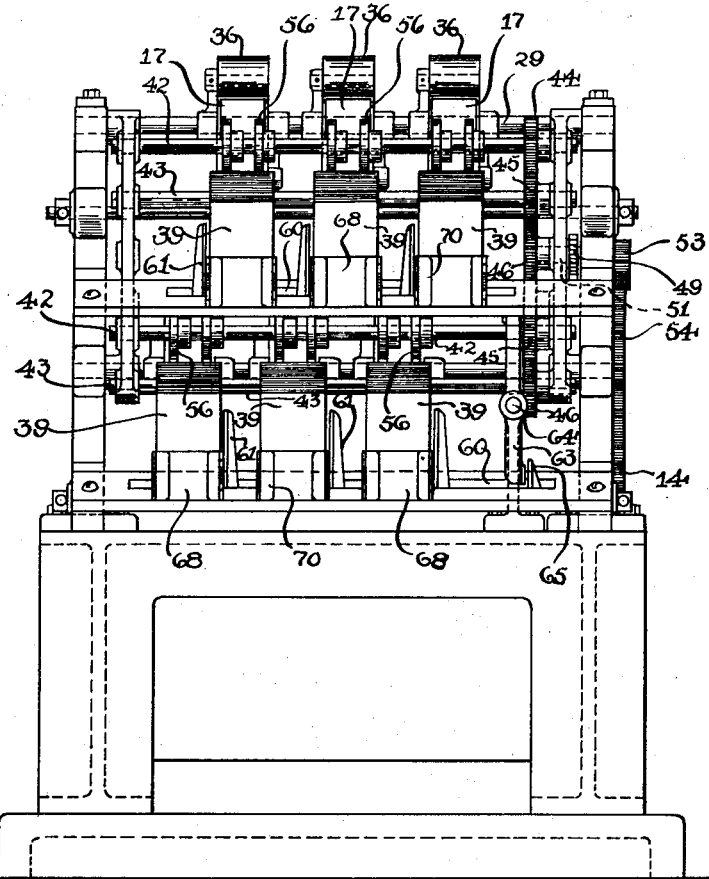

April 24, 1928.

L. P. WILLSEA 1,666,984

DELIVERY MECHANISM

Filed Jan. 26, 1927

INVENTOR
Louis P. Willsea
BY
H. K. Simms
ATTORNEY

Patented Apr. 24, 1928.

1,666,984

UNITED STATES PATENT OFFICE.

LOUIS P. WILLSEA, OF ROCHESTER, NEW YORK.

DELIVERY MECHANISM.

Application filed January 26, 1927. Serial No. 163,773.

The present invention relates to delivery mechanisms for machines which cut pieces from sheets by means of combined slitting and transverse cutting mechanisms. An object of the invention is to provide a delivery mechanism which will operate on the pieces received from the transverse cutting mechanism in a manner to separate or space said pieces. Another object of the invention is to provide a delivery mechanism which will receive the pieces from the transverse cutting mechanism and cause them to travel at a greater speed than the transverse cutting mechanism so that the pieces are separated or spaced while traveling through the delivery mechanism. Another object of the invention is to provide a delivery mechanism having a plurality of feeding devices arranged side by side and receiving in one plane the pieces cut by the transverse cutting mechanism from a plurality of strips which have been cut from a single sheet, the feeding devices being so constructed that the pieces cut from adjacent strips by the transverse cutting mechanism will be delivered at different planes. Another object of the invention is to provide a delivery mechanism embodying a plurality of feeding mechanisms each of which employs two cooperating belts the intake or receiving portions of each pair of belts being situated in the same plane, while the discharge portions of each pair of belts is arranged at a plane different from the plane of the discharge portions of the pair of belts next to it. Another object of the invention is to provide for guiding sheet pieces into a receptacle in stacked relation from a feeding mechanism which projects the pieces into a receptacle, the guiding means being so constructed that the rear end of the piece passes from the guiding means in a lower position than the forward end in order to avoid difficulties arising from the gravitational descent of the forward end. Another object of the invention is to provide, in combination with the machine which slits the sheet of paper and cuts the strips transversely, a feeding mechanism which will discharge the cut pieces into separate stacks. Another object of the invention is to provide in combination with the machine which slits the sheet of paper and then cuts the strips thus formed into separate pieces, a delivery mechanism which will deliver the pieces into separate receptacles so situated that each stack may be acted upon by its own agitating means. Another object of the invention is to combine with a machine which slits a sheet of paper and then cuts the strips thus formed, a delivery mechanism which will deliver the pieces from each strip in a separate stack at the top of the latter, provision being made for removing the pieces in measured amounts from the bottom of each stack.

To these and other ends, the invention consists of certain parts and combinations of parts, all of which will be hereinafter described; the novel features being pointed out in the appended claims.

In the drawings:

Fig. 1 is a side view of a printing mechanism adapted to operate on sheet material and equipped with a slitting and a transverse cutting mechanism and combined with a delivery mechanism forming the subject matter of this invention;

Fig. 2 is a plan view of the machine shown in Fig. 1;

Fig. 3 is an enlarged vertical section through the delivery mechanism;

Fig. 4 is an end view of the discharge end of the delivery mechanism;

Fig. 5 is a fragmentary sectional view illustrating the agitating mechanism;

Figure 6:
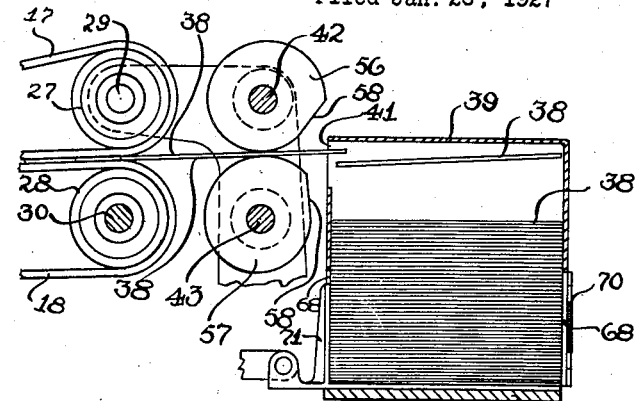
Fig. 6 is a fragmentary view showing the manner in which the pieces are guided into the receptacle.

The invention is used in connection with a machine of any suitable type which will operate on a sheet of material first to cut it into strips and then to cut the strips in separate pieces. In the illustrated embodiment of the invention the material to be operated on is in the form of a roll 1 of sheet material, which is fed from the roll about a tensioning roll arranged on the shaft 2 and geared by a gear 3 to a gear 4 on a shaft 5 on which the platen is arranged. The gear 4 cooperates with the gear 6 on the shaft 7 which supports the printing cylinder 8, the latter being inked by an inking mechanism 9, all of which may be of any suitable construction. From the platen the sheet passes to rotary slitting cutters 10, which cut the sheet into strips. These strips are then divided transversely into pieces 38 by being passed through a cut-off mechanism embodying two rotary cutting rolls 11 operating on all the strips formed by the slitting mechanism. The mechanisms are all driven from a driving shaft 12 which through a gear 13 meshes with a large gear 14, the latter in turn meshing with the gear 4, with the intermeshing gears 15 which drive the slitting cutters, and with the intermeshing gears 16 which drive the cut-off mechanism 11.

From the transverse cut-off mechanism the pieces 38 are delivered to a delivery mechanism. This delivery mechanism comprises, in this instance, a plurality of feeding mechanisms corresponding in number preferably to the strips produced by the slitting cutters. Each feeding mechanism, in this instance, embodies two sets of endless belts 17 and 18, one arranged above the other and both having adjacent portions operating in contact one with the other. All of these pairs of belts pass around pulleys 19 and 20 arranged on two shafts 21 and 22 at the receiving end of the machine, so that the receiving portions of the feeding mechanisms are in the same plane. Adjacent pairs of belts proceed in different directions from the shafts 21 and 22, alternate pairs of belts being directed at one angle and the other alternate pairs being directed at another angle so that the delivery or discharge portions of adjacent feeding mechanisms are in different planes. In this instance, downwardly extending pairs of belts 17 and 18 pass respectively about pulleys 23 and 24 arranged on two shafts 25 and 26 respectively. The upwardly directed belts 17 and 18 pass about pulleys 27 and 28 arranged on shafts 29 and 30 respectively above the shafts 25 and 26. Idler pulleys 31 and 32 cooperate respectively with the inner faces of the upper belts 18 and the inner faces of the lower belts 17, producing a deflection in said belts, so as to hold them in firm contact with their cooperating belts. Idler pulleys 33 and 34 cooperate respectively with the outer faces of the belts 18 of the upper set and the lower belts 17 of the lower set to hold said belts in frictional contact with said belts. Idler pulleys 36 and 37 cooperate respectively with the belts 17 of the upwardly deflected pairs and the belts 18 of the lower deflected pairs. All of said idler pulleys are adjusted to maintain the belts in a substantially taut condition with the minimum amount of slack.

The driving of the belts or feeding mechanism may be effected in any suitable manner. In this instance, a gear 54 meshes with the gear 16 of the cutoff mechanism and the gear 54 in turn meshes with a gear 53 on the shaft 22. The shaft 21 and its belts 17 are driven by frictional engagement with the belts 18 which passes about the pulley 20 on the shaft 22 so that the belts 17 and 18 are driven at the same surface speed. This speed however is higher than the peripheral speed of the cutoff cutters, due to the fact the gears 54 and 53 provide a speed increasing gearing.

Owing to the fact that the surface speed of the feeding belts is greater than the surface speed of the cutoff cutters, the pieces 38 which are cut from the strips produced by the slitting mechanism are advanced more quickly away from the cutoff cutters and proceed between the feeding belts in spaced relation, as is shown in Fig. 3, adjacent rows of pieces being discharged at different planes.

The purpose of delivering the pieces formed from adjacent strips at different horizontal planes is to permit the employment in connection with the different mechanisms of receptacles for receiving the pieces, for it will be apparent that if the pieces were delivered all at the same plane from all of the different strips, the provision of receptacles for the reception of the pieces would be a difficult one owing to the contiguity of the strips and this is especially true where it is desired to agitate the contents of the receptacle.

The receptacles in this instance, are in the form of boxes 39 supported in two sets, in this instance, each upon a different bed plate 40 connecting the sides of the machine. Each receptacle is provided with a slot 41 opposite the line of delivery from a pair of belts as shown at 17 and 18. The receptacle is placed at a slight downward incline, the plane of delivery of the pieces from one of the pairs of belts 17 and 18 being correspondingly arranged. In other words, the pieces 38 are delivered into the receptacle at the top and fall by gravity onto the top of the stack within the receptacle, the edge of each piece slipping down against the opposite wall.

With the end in view of causing the pieces 38 to fall in proper positions on the top of the stack in a receptacle 39, a novel guiding means succeeding each pair of feeding belts is employed for cooperation with the pieces after they are projected by the belts 17 and 18 in order to prevent the pieces from having their forward ends become relatively lower than their rear ends, for it will be apparent that the forward portions having been released first from the belts 17 and 18 would begin to drop before the portions last passing were released from the belts. The upper surface of the forward end is thereby presented to the resistance of the air which would tend to tip up the rear end as soon as it is released. This permits the forward end of each succeeding piece to be projected underneath the tipped up rear end of its predecessor. This is overcome in this invention by providing a guiding means which progressively changes the position of each piece in relation to the plane of motion as initiated upon release from the belts so that by the time the rear end is disengaged from the guide the piece as a whole will be at an angle, with the forward end elevated, and as a consequence of the aforementioned angle of approach each piece will volplane into the receptacle on top of its predecessors.

Figure 7:
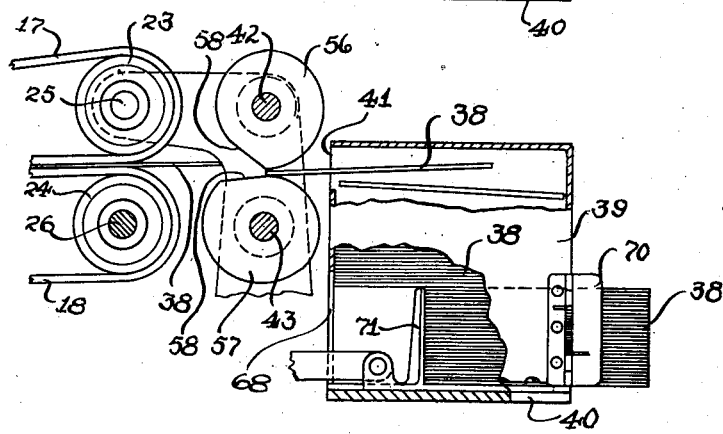
Fig. 7 is a similar view showing the manner in which the rear end of the piece is lowered with reference to the forward end by the guiding means.
Figure 8:
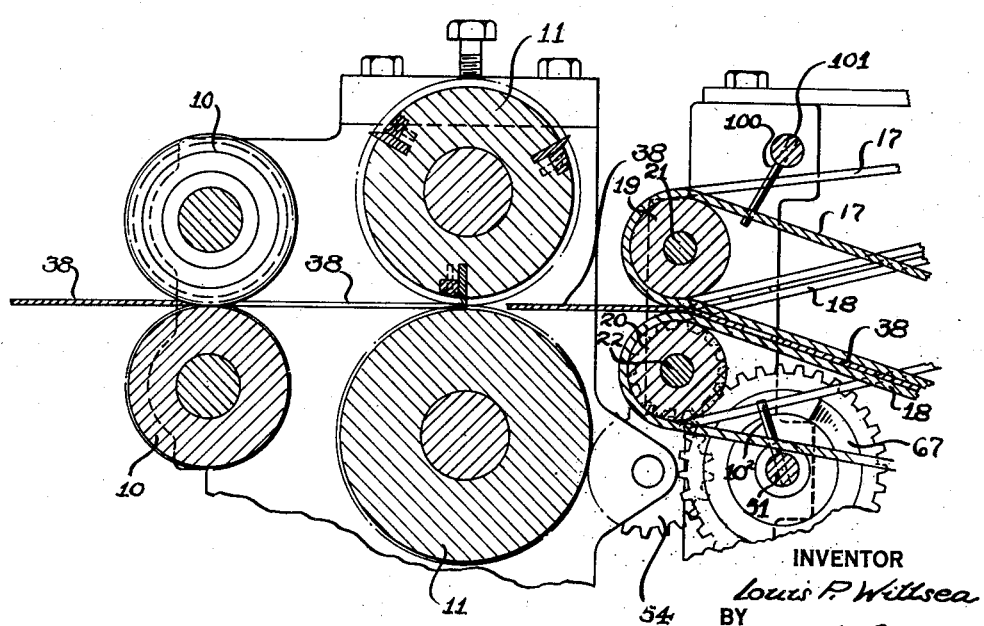
Fig. 8 is a fragmentary sectional view showing the manner in which the delivery mechanism advances the pieces away from the transverse cutting mechanism to space the pieces at their ends for travel through the delivery mechanism.

The guiding means for each feeding means embodies in this instance two rotary members 56 and 57 mounted in two sets on the shafts 42 and 43 respectively, two of said shafts 42 and 43 being provided one for the upper delivery feeding devices and the other for the lower delivery feeding device. Each rotary member has in this instance a guiding surface progressively shifting away from the axis of rotation on a volute curve, a flat surface 58 being provided on each member between the ends of the curve. The shafts 42 and 43 are turned in such a manner that the high point on one guiding member operates opposite the low point on the other, the high point on the lower guiding member being uppermost when the forward edge of piece 38 passes between the guiding members and before the piece is discharged by the belt 17 and 18. Thereafter the lower member 57 turns to move the low point to the highest position, thus causing the successively engaged portions of the piece to gradually descend so that, as the piece issues from the guides, its rear portion will be discharged relatively lower than its forward portion. The two guide members 56 and 57 make one rotation for each piece delivered. As will be seen by referring to Fig. 7 as one piece 38 passes from the guides, the flat surfaces 58 form an angle between them, so as to permit the ready reception between the two surfaces of another piece projected by the belts 17 and 18. For operating the guiding means the two sets of shafts 42 and 43 are geared together by gears 44 and 45, with the upper set of gears 44 and 45, a gear 46 meshes, and with the lower set a gear 47 meshes, the latter and the gear 46 in turn meshing. With the gear 46 a sprocket chain 49 connects through a sprocket wheel 48, said sprocket chain also connecting with a sprocket wheel 50 turning on a fixed shaft 51. Turning with the sprocket wheel 50 is a gear 50ª which meshes with a gear 50ᵇ on the shaft 22 so that the guiding means is driven from the printing machine.

After the pieces are delivered into the receptacles they are preferably subjected to agitation. To this end one side of each receptacle is provided with an opening 59 and below each set of receptacles a sliding rod 60 is arranged. This shaft is provided with arms 61. The openings in the upper set of receptacles are on the opposite sides of the receptacles from those on which the openings on the lower set of receptacles are arranged and the arms 61 on the shafts 60 are arranged opposite the openings in the two sets of receptacle. Each shaft has a spring 62 operating thereon to hold such shaft in a direction where the arms 61 will engage the sides of the pieces in the receptacles 39 through the openings 59. A common means may be provided for operating said shaft 60 in opposite directions against the action of their springs 62. In this instance, this common operating means embodies two arms 63 on a shaft 64, said arms 63 cooperating with arms 65 on the two slides 60 to move one slide in one direction and the other slide in the other direction in order to carry the arm 61 away from the pieces in the receptacle 39. The shaft 64 is oscillated in any suitable manner and, to this end in this instance, has an arm 66 which travels on a cam 67 formed on the shaft 51 to turn with the latter, so that this mechanism is also operated from the drive shaft 12 of the printing mechanism.

A novel means is employed for removing the pieces from the receptacles in measured amounts. To this end each receptacle has two of its opposite walls provided with openings 68 and a slide 69 operates on the bottom of the receptacle, this slide having an upstanding wall 71 which normally closes the opening 68 in the front walls while the rear opening 68 is closed normally by two spring pressed shutters 70 so that the wall 71 can push the pieces 38 through the rear wall. The slides 69 of the lower bed plate 40 are in this instance controlled separately from the slides of the upper bed plate 40. To this end each slide has pivoted thereto at 72 a link 73 which in turn is pivoted at 74 to an arm 75 on a rock shaft 76 there being provided two of these rock shafts, one for each set of slides 69 on a bed plate 40. A handle 77 is connected to each rock shaft. As the pieces fall into a receptacle 39, they stack upon the slide 40 and after the pieces have accumulated in the receptacles above the upper edge of the end wall 70 on the slide, the latter is moved so that the end wall 70 pushes out of the rear opening 68 of the receptacle 39 an amount of pieces determined by the height of the end wall 70. With the end in view of confining the belts 17 and 18 against shifting on their pulleys 19 and 20 guides for the edges of said belts are provided. In this instance these guides are in the form of fingers 100 depending from a rod 101 and cooperating with the side edges of the belts 17 and fingers 10² projecting upwardly from the shaft 51 and cooperating with the edges of the belts 18.

From the foregoing it will be seen that there has been provided a novel delivery mechanism for machines which cut a single sheet first into strips and then into separate pieces. The delivery mechanism operates at a faster speed than the cutoff mechanism so that the pieces are separated as they pass through the delivery mechanism. Pieces cut from adjacent strips are delivered at different planes so that the pieces of different strips may be separately stacked. Each stack has its pieces delivered at the top thereof so that the pieces may be removed in measured amounts from the bottom of the stack without interfering with the operation of the machine. A novel guiding means is provided between the feeding means and a stack whereby the rear end of each piece is depressed so as to overcome the difficulties which would result from the gravitational fall of the previously discharged forward end and the piece is caused to drop properly on the top of the stack. Novel means is provided for agitating the pieces in the stacks so that a compact stack is obtained.

What I claim as my invention and desire to secure by Letters Patent is:

1. The combination with a sheet slitting mechanism and a transverse cutting mechanism for cutting the strips formed by the slitting mechanism, of a delivery mechanism having a plurality of feeding mechanisms receiving the pieces cut from the different strips, some of said feeding mechanisms having their discharge ends discharging the pieces at the different horizontal planes from other of said feeding devices.

2. The combination with a sheet slitting mechanism and a transverse cutting mechanism for cutting transversely the strips formed by the slitting mechanism, of a delivery mechanism having a plurality of feeding mechanisms all of which have their receiving ends at the same horizontal plane, some of said feeding mechanisms having their discharge ends discharging the pieces at a horizontal plane different from that at which the other of said feeding mechanisms discharge the pieces.

3. A delivery mechanism comprising a plurality of feeding mechanisms arranged side by side and having their receiving points at the same horizontal plane, the delivery points of alternate feeding mechanisms being in one plane and the delivery points of the other alternate feeding devices being in another plane.

4. A delivery mechanism of the class described comprising a plurality of pairs of endless belts, each pair having its members turning with the surface of one engaging with the surface of the other and providing between them a receiving point and a discharge point, the receiving points of all the pairs being at a single horizontal plane, and the discharge points of alternate pairs being at one horizontal plane and the discharge points of the other alternate pairs being at another horizontal plane.

5. The combination with a sheet slitting mechanism and a transverse cutting mechanism for cutting the strips thus formed into individual pieces, of a plurality of feeding means receiving from the transverse cutting mechanism the pieces cut from the several strips, said feeding means having their receiving points at the same horizontal plane, and adjacent feeding devices having their discharge points at different horizontal planes.

6. The combination with a feeding mechanism for a piece of sheet material and a receptacle in which the piece of sheet material is projected by the feeding mechanism, of guiding means arranged between the feeding means and the receptacle and through which the pieces are projected by the feeding means to the receptacle, said guiding means being movable to permit each piece to pass therefrom with its forward end relatively higher than at its rear end, to avoid the gravitational fall of the forward end when adequate guiding means is not provided.

7. The combination with a feeding means for a piece of sheet material and a receptacle into which the piece of sheet material is projected by the feeding means, of a rotary guide arranged between the feeding means and the receptacle and having its surface so formed that the forward end of each piece passes thereover relatively higher than the rear end, so as to avoid the effect of the gravitational fall of the forward end of the piece when the latter is not guided.

8. The combination with a feeding means for a piece of sheet material, and a receptacle into which the piece of material is projected by the feeding means, of a pair of cooperating rotary guides arranged between the feeding mechanism and the receptacle, said guides having volute shaped cooperating faces between which the piece is projected by the feeding means, and means for operating the guides so that the forward end of the piece passes between the guides relatively higher than the rear end of the piece.

9. The combination with a receptacle, of means for feeding sheets of material into the top of the receptacle to permit them to fall by gravity in stacked relation within the receptacle, and means for effecting the removal of the pieces from the bottom of the stack.

10. The combination with a receptacle, of feeding means for feeding the sheets one at a time into the top of the receptacle to permit the sheets to fall by gravity into stacked relation, and means for removing the sheets in measured amounts from the bottom of the stack in the receptacle.

11. The combination with a receptacle having an opening in one of its side walls adjacent the bottom, of feeding means for feeding the sheets one at a time into the receptacle at the top of the latter to permit the sheets to fall by gravity into stacked relation, and a slide movable in the receptacle at the bottom thereof to displace the pieces from the stack laterally through the opening in the side of the receptacle.

12. The combination with a receptacle having an opening in one of its side walls adjacent the bottom, of feeding means for feeding the sheets one at a time into the receptacle at the top of the latter to permit the sheets to fall by gravity into stacked relation, and a slide movable in the receptacle at the bottom thereof to displace the pieces from the stack laterally through the opening in the side of the receptacle, and spring pressed means normally closing the opening in the side of the receptacle and yielding under the pressure of the pieces moved by the slide.

13. The combination with a receptacle having an opening in its side wall, of means for feeding pieces of sheet material one at a time into the receptacle at the top of the latter to permit the pieces to fall into stacked relation, and an agitator movable to engage the stack in the receptacle through such opening in the side wall of the receptacle.

14. The combination with a plurality of receptacles arranged in spaced relation and each having an opening in one of its side walls, of a plurality of feeding devices for feeding one at a time sheet pieces into the receptacles at the tops of the latter, so that the pieces may fall by gravity into stacked relation, a slide mounted below the receptacle and arms projecting upwardly from the slide and cooperating with the pieces in the different receptacles through the said openings in the side walls to agitate the pieces, and cause them to snugly fit into the receptacles.

15. The combination with a sheet slitting mechanism and mechanism for cutting transversely the strips formed by the slitting mechanism, of a delivery mechanism having a plurality of feeding mechanisms, all of which have their receiving ends in the same plane to receive the pieces from the transverse cutting mechanism, some of said feeding mechanisms having their discharge ends discharging the pieces in planes different from that at which the others of said feeding mechanisms discharge the pieces, and a plurality of sets of receptacles into which the pieces of sheet material are fed at the tops of said receptacles, one set receiving the pieces from the feeding mechanisms discharging in one plane, and the other sets receiving the pieces from the feeding mechanisms discharging in other planes.

16. The combination with a feeding mechanism, of a receptacle into the top of which sheet pieces are fed one at a time by the feeding mechanism, and means for removing the pieces in measured amounts from the bottom of the stack in the receptacle.

LOUIS P. WILLSEA.